United States Patent [19]
DeVos

[11] 3,880,563
[45] Apr. 29, 1975

[54] MOLDING APPARATUS

[75] Inventor: Daniel A. DeVos, Brussels, Belgium

[73] Assignee: Pittsburgh Corning Corporation, Pittsburgh, Pa.

[22] Filed: July 6, 1973

[21] Appl. No.: 377,059

[52] U.S. Cl. ............... 425/175; 425/384; 425/388
[51] Int. Cl. ........................................ B28b 21/78
[58] Field of Search .......... 425/383, 384, 388, 175, 425/405

[56] References Cited
UNITED STATES PATENTS

| | | | |
|---|---|---|---|
| 1,357,343 | 11/1920 | Novotny | 425/384 |
| 1,817,545 | 8/1931 | Copeman | 249/111 X |
| 3,183,289 | 5/1965 | Leavesley | 264/220 |
| 3,216,074 | 11/1965 | Harrison | 425/501 X |
| 3,290,418 | 12/1966 | Best | 425/388 X |
| 3,353,219 | 11/1967 | Snyder | 425/405 |
| 3,753,830 | 8/1973 | Cruckshank et al. | 425/388 X |

*Primary Examiner*—Roy Lake
*Assistant Examiner*—Craig R. Feinberg
*Attorney, Agent, or Firm*—Stanley J. Price, Jr.

[57] ABSTRACT

A shell having an outer surface with the configuration of a surface of the molded or shaped product is fabricated from several layers of a resinous thermosettng compound. Heat sink elements are embedded in the shell adjacent to the outer surface of the shell and have portions extending into the shell cavity. The shell cavity has a porous fill comprising substantially spherical cellular ceramic nodules bonded to each other and having interconnecting interstitial voids. The open end portion of the shell is sealed by a layer of resinous material with a fluid inlet and outlet for circulation of cooling fluid through the shell cavity. A plurality of capillaries extend from the outer surface of the shell to a common conduit which provides a suction or negative pressure between the mold outer surface and the material to be shaped. The mold is constructed by first applying a thin layer of thermosetting resin or low melt metallic alloy to the surface of a pattern having guide pins with capillary tubes thereon. A second layer of resin is applied to the first layer and the heat sink elements are embedded in the second layer closely adjacent to the first layer. A third relatively thick structural layer of thermosetting resin including fillers is applied to the first layer to form the mold shell. The inner cavity of the mold shell is filled with a mixture of cellular ceramic nodules and thermosetting resin to form a relatively rigid porous fill having interconnecting interstitial voids. The capillary tubes are connected to a common conduit in a separation box. The cavity is sealed by a layer of resinous material with fluid inlet and outlet connections therein. The mold so formed is suitable for use in either vacuum, extrusion or blowing molding processes.

8 Claims, 6 Drawing Figures

MOLDING APPARATUS

BACKGROUND OF THE INVENTION

1. Field of the Invention

This invention relates to molding apparatus and method of making the same and more particularly to a surface temperature controlled molding apparatus and method of making the same.

2. Description of the Prior Art

In high volume production of molded or shaped plastic elements the molds have a metallic outer shell. The fabrication of such molds is expensive and changes in the surface configuration of the mold require expensive welding, grinding, polishing and the like. In order to reduce the initial costs of making the molds the shell may be formed from a resinous material that is rigidified by any suitable means. Problems, however, are present in the control of the temperature of this type of mold. It is essential that the surface of the mold be quickly cooled after the plastic product is shaped thereon. Otherwise, the plastic product cannot be removed from the mold until it is sufficiently cooled to maintain its mold shape. Therefore, although the resinous molds are less expensive to fabricate, the rate of production of the molded product in such a mold is limited by the slow cooling of the plastic shaped material within the resinous mold.

U.S. Pat. No. 3,183,289 discloses a porous metal mold. U.S. Pat. No. 3,216,074 discloses a mold which may be of pellets with an external smooth surface of the desired mold configuration. U.S. Pat. No. 3,587,132 discloses molding apparatus having provisions for the flow of heat exchange fluid within the mold. U.S. Pat. NO. 3,256,564 discloses a heat exchange element for cooling a portion of the material to be shaped and U.S. Pat. No. 1,817,545 discloses heat exchange elements embedded in a plastic container.

There is a need for resinous molds in which the temperature of the mold surface can be effectively controlled.

SUMMARY OF THE INVENTION

This invention relates to molding apparatus that includes a shell having an outer surface with a preselected configuration and a cavity with an opening therein. The shell includes at least one layer of thermosetting resinous compound. A porous fill is positioned in the cavity and has interconnecting interstitial voids for the flow of fluid therethrough. The opening in the shell cavity is closed by a seal member. The seal member has fluid inlet and outlet openings for circulation of heat exchange fluid through the cavity to control the temperature of the shell outer surface. The porous fill is a substantially rigid mass of cellular ceramic nodules bonded to each other with a coating of resinous bonding material. The rigid mass provides structural support for the shell and interstitial voids for the flow of fluid therethrough. Heat sink elements are embedded in the shell and have a portion extending into the porous fill in the mold cavity.

The method of making the mold includes forming a shell with an outer surface of a preselected configuration and a cavity with an opening therein. The cavity in the shell is filled with a porous fill having interconnecting interstitial voids for the flow of fluid therethrough. The opening in the shell cavity is sealed by a resinous sealing compound and fluid inlet and outlet openings are provided in the seal for circulation of heat exchange fluid through the cavity. The method further includes embedding heat exchange elements in the shell adjacent the outer surface thereof. With this arrangement inexpensive resinous molds may be prepared that have temperature controlling features in both the circulation of a heat exchange fluid through the shell cavity and the heat exchange elements embedded in the shell adjacent the outer surface thereof. The porous fill in the shell cavity provides interconnnected interstitial voids for the flow of heat exchange fluid therethrough and structural support for the shell.

Accordingly, the principal object of this invention is to provide a resinous mold that includes temperature control elements.

Another object of this invention is to provide a resinous mold that includes a porous fill type support with interconnecting interstitial voids for the flow of heat exchange fluid therethrough.

These and other objects and advantages of this invention will be more completely disclosed and described in the following specification, the accompanying drawings and the appended claims.

DESCRIPTION OF THE PREFERRED EMBODIMENTS

Figure 1:
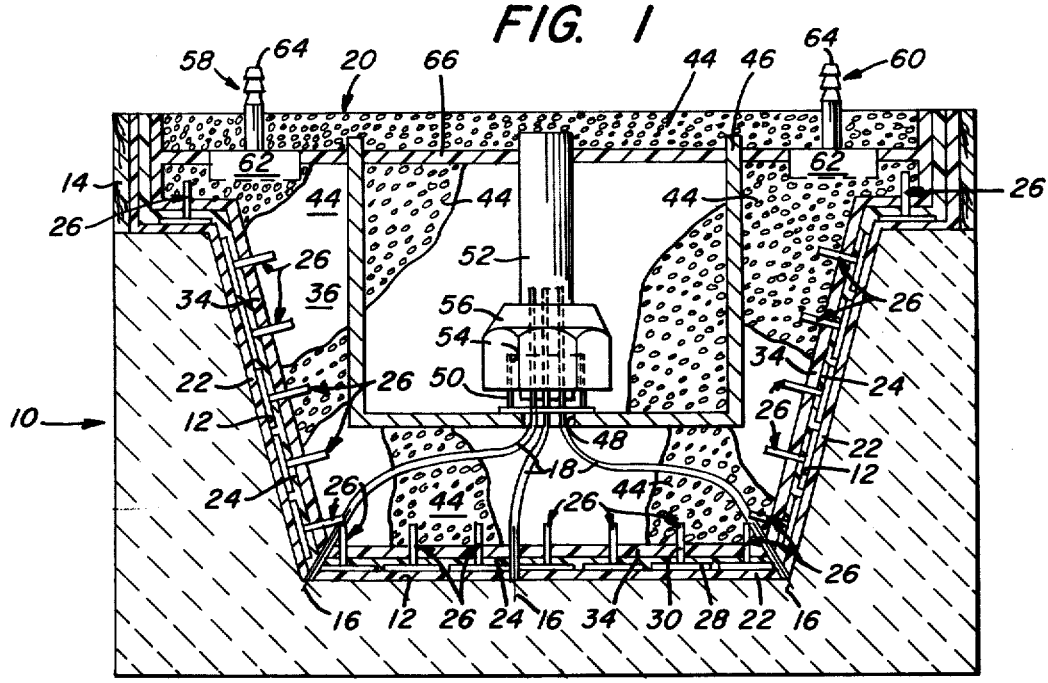
FIG. 1 is a view in section of a pattern with the improved mold positioned therein.

Referring to the drawings and particularly FIG. 1 there is illustrated a pattern generally designated by the numeral 10 that has an inner cup shaped surface 12 which conforms with a desired surface configuration of a molded product. A wooden frame 14 is positioned on the upper peripheral surface of the pattern 10 and provides an upper extension for the pattern 10. Before the mold is formed within the pattern 10 the inner surface 12 of the pattern and the inner surface of the frame 14 are coated with a suitable parting agent not shown. A plurality of pins 16 are embedded in the surface 12 and are arranged to support capillary tubes 18. The capillary tubes 18 are positioned on the pins 16 and suitably gathered toward the center of the mold generally designated by the numeral 20. The pattern 10 may be fabricated of any suitable material such as wood, plaster or other ceramic material that may be shaped to provide the desired inner surface 12. The capillary tubes 18 are preferably formed from a suitable flexible material such as rubber, plastic or the like. The capillary tubes, however, should have sufficient rigidity to maintain a flow passage therein when subjected to suction.

The mold 20 is fabricated by first applying a thin surface coat 22 of a thermosetting compound such as the well known epoxy resins with suitable hardners. The first surface coat 22 may also be formed from a low melt metallic alloy that is sprayed on the pattern surface 12 by well known gun spraying processes. It is preferred that the first surface coat 22 have a thickness of about 1 millimeter. After the first surface coat 22 has rigidified a second surface coat 24 of a thermosetting resinous material having a thickness of about 2 millimeters is applied to the first surface coat 22.

Figure 3:
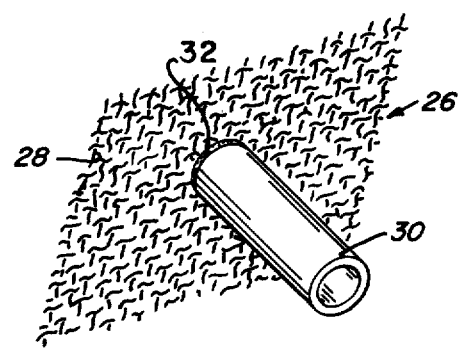
FIG. 3 is a perspective view of one of the heat transmitting elements.

Heat sink elements generally designated by the numeral 26 and illustrated in detail in FIG. 3 include a wire mesh portion 28 and a cylindrical metal tube 30 secured to the wire mesh portion 28 by a weld 32. The wire mesh portion 28 is embedded in the second surface coat 24 of mold 20 during the gelling of the second surface coat 24. It is preferred that the wire mesh portion 28 be positioned closely adjacent to the first surface coat 22 so that more efficient heat transfer will take place between the first surface coat 22 and the heat transfer elements 26. The metallic tube 30 extends rearwardly into the cavity formed in the mold 20.

A structural layer of thermosetting resinous compound 34 is applied to the inner surface of the second surface coat 24. The structural layer 34 preferably has a thickness of about 3 millimeters and includes suitable reinforcing material such as chopped fiberglass or the like. Thus, the first surface coat 22, the second surface coat 24 and the structural layer 34 form a shell that has an outer surface with a predetermined desired configuration and an inner cavity which will be designated by the numeral 36.

An admixture of cellular ceramic nodules and a resinous bonding material such as an epoxy resin is prepared in which the preferred proportions of the constituents is 50 percent by weight cellular ceramic nodules and 50 percent by weight resin bonding compound. The cellular ceramic nodules are formed by admixing pulverulent glass and a cellulating agent and subjecting the admixture to an elevated cellulating temperature. U.S. Pat. No. 3,354,024 describes in detail the cellular ceramic nodules and method of making the same. The nodules are substantially spherical in shape and it is preferred that the nodules have a uniform diameter of approximately one-sixth of an inch. With this optimum diameter the admixture when set includes approximately 30% by volume void space as interconnected interstitial voids through which heat transfer fluid is free to circulate.

Figure 2:
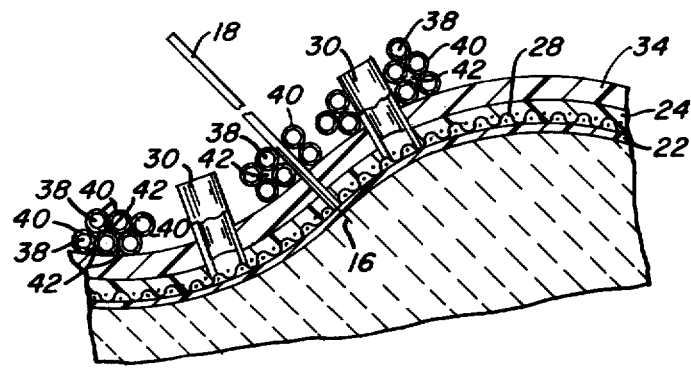
FIG. 2 is a fragmentary view of the shell portion of the mold with the heat sink elements embedded therein, the capillary tube extending therethrough and a portion of the porous fill.

Referring to FIGS. 1 and 2 the cellular ceramic nodules 38 are illustrated with a surface coating 40 of resinous bonding material positioned within cavity 36 with interconnected interstitial voids 42 therebetween. The bonded cellular ceramic nodules 38 form a rigidifying fill 44 when positioned in the mold cavity 36 as illustrated in FIG. 1. A layer of the admixture of nodules with the surface coating of resinous bonding material 40 thereon is positioned within the cavity 36 before the bonding material has rigidified to permit the fill 44 to abut the inner surface of the resinous structural layer 34 and extend to a depth of approximately one-third of the cavity 36. The capillaries 18 extend through the porous fill 44 to a central location and the metallic tubes 30 of the heat transfer elements 26 also extend into the porous fill 44.

A separation box 46 is positioned within the cavity 36 on top of the layer of porous fill 44 and has a bottom inlet opening 48 with a cylindrical threaded collar 50 extending upwardly into the separation box 46. The capillaries 18 extend through the opening 48 and threaded collar 50 into a tube 52. The inner portion 54 of collar 50 is filled with a suitable mastic material to provide an airtight connection so that suction within tube 52 will produce a suction in all of the capillaries 18. A nut 56 threadedly engages the sleeve threaded collar 50 to secure the tube 52 thereto. With this arrangement negative pressure on tube 52 will provide a negative pressure on the external surface of the mold 20 through the connecting capillary tubes 18.

Additional fill 44 comprising the cellular ceramic nodules with a resinous bonding coating thereon is positioned around the separation box 46 of substantially fill the cavity 36. Fluid flow connectors 58 and 60 each have a distributor box portion 62 positioned in the porous fill 44 and a connecting conduit portion 64 extending outwardly beyond the cavity 36. A thick layer of resinous sealing material 66 is positioned on the upper surface of the fill 44 and is preferably formed from an epoxy resin having chopped fiberglass or other suitable reinforcing material. The layer 66 thus seals the inner cavity 36 and provides a fluid circulating chamber within the cavity 36 with fluid flow connectors 58 and 60. The distributor boxes 62 within fill 44 are preferably perforated boxes to permit the flow of fluid therethrough into and out of the inner cavity 36. Where desired, additional fill 44 may be positioned on top of the layer 66 and leveled with the upper edge of the wooden frame 14. After the resinous material has cured, the mold 20 is removed from the pattern 10 for use in molding operations.

Figure 4:
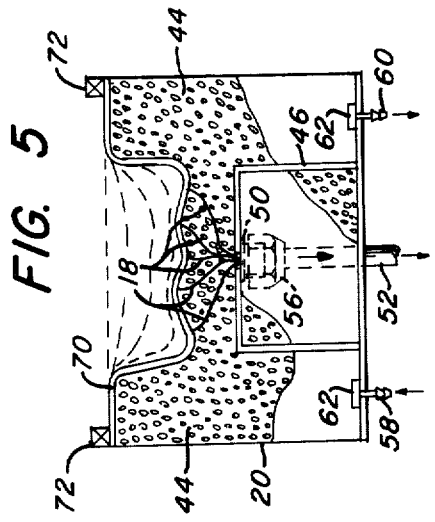
FIG. 4 is a diagrammatic view of the mold illustrated in FIG. 1 with a thermoplastic sheet positioned thereabove.
Figure 5:
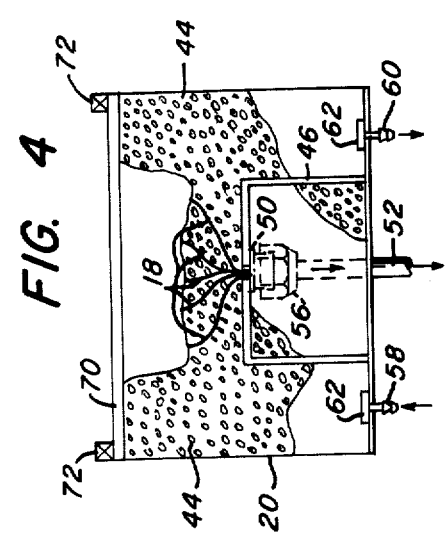
FIG. 5 is a view similar to FIG. 4, illustrating the manner in which the thermoplastic sheet is shaped within the mold.

As is illustrated in FIGS. 4 and 5, the mold 20 is inverted and the conduit 52 is connected to a source of suction or negative pressure. The flow connector 58 is connected to a source of fluid under pressure, as for example water, at 10°C. at a pressure of 0.2 kilograms per square centimeter. The water is circulated through the porous fill 44 and is withdrawn from the mold 20 through outlet connection 60. A sheet of thermoplastic material, as for example a 6 millimeter thick ABS sheet 70, is positioned on the upper flat surface of the mold and maintained in that position by suitable bracket positioning means 72. The sheet has been uniformly preheated to 180°C. in an oven. The suction through conduit 52 deforms the sheet as illustrated in FIG. 5 to assume a configuration similar to the surface of the mold 20. After the sheet deformed to the configuration of the mold the water circulating through the porous fill 44 cools the mold surface as illustrated in FIG. 6 and indicated by the . . . line of curve C.

Figure 6:
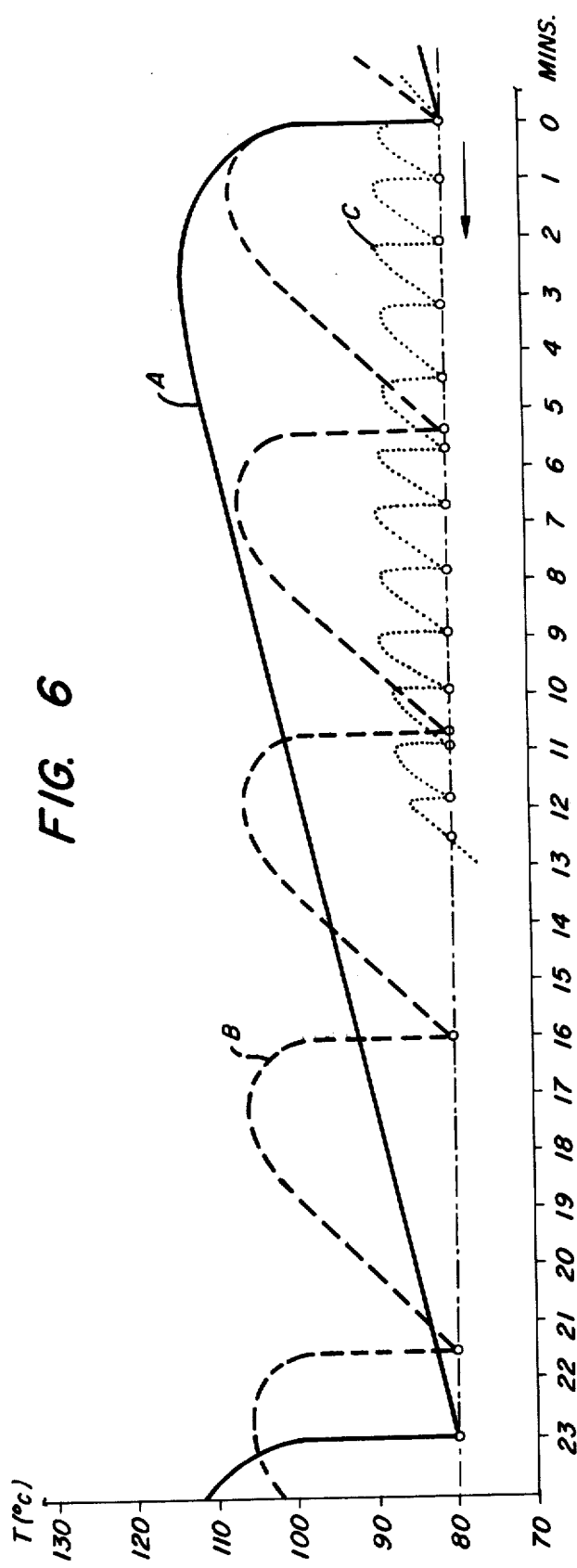
FIG. 6 is a graphic representation of the temperature control properties of the mold where the rate of cooling of the mold surface is illustrated for various mold configurations.

In FIG. 6 curve A starts at an inner surface temperature of 80°C. and attains a temperature of approximately 110°C. from the sheet of plastic material 70. Thereafter, approximately twenty minutes are required to cool the mold surface to the 80°C. temperature. Thus, a complete cycle of curve A extends for a period of 23 minutes. The cooling curve A results in the absence of both circulation of a cooling fluid within the cavity 36 and without the heat exchange elements 26 positioned adjacent the surface of the mold 20. Curve B designated by the --- line indicates the cooling cycle of a mold similar to that illustrated in which fluid is circulated as above described without the heat exchange elements 26. Thus the mold at a surface temperature of 80°C. attains a temperature of approximately 105°C. after a minute and requires a cycle of approximately 4 minutes to cool to 80°C. Thus, the cycle of curve B is approximately 5½ minutes. However, the cooling cycle is substantially reduced when the mold includes both the circulation of a cooling liquid and the heat exchange elements 26 previously described as is illustrated by curve C. The cooling cycle wherein the surface temperature of the mold returns to 80°C. is slightly greater than 1 minute. It will be apparent from the graphical representation in FIG. 6 that the productivity with the resinous shell type mold having both the circulating cooling liquid and the heat exchange elements is substantially increased when compared with molds not having the heat exchange elements or the circulating cooling liquid.

Althoug throughout the specification the thermosetting resinous compounds were referred to as epoxy type resins, it should be understood that any suitable resinous material, for example polyester compounds, may be employed.

It will be apparent from the above description that the resin coated cellular ceramic nodules provide a rigid support for the resinous shell and further provide interstitial voids therebetween for the flow of cooling media within the mold cavity. The heat exchange elements are in heat exchange relation with both the surface of the mold shell and with the cooling media flowing through the interstitial voids in the cellular ceramic nodule fill.

It should be understood that the above described mold may be used with equal facility in extrusion forming processes and blow forming processes and the advantageous features herein discussed would also be present in the utilization of the herein described mold in such other processes.

According to the provisions of the patent statutes, I have explained the principle, preferred construction and mode of operation of my invention and have illustrated and described what I now consider to represent its best embodiments.

I claim:
1. In a molding apparatus comprising,
a shell having an outer surface with a preselected configuration and a cavity with an opening therein, said shell including at least one layer of a thermosetting resinous compound,
a porous fill positioned in said cavity, said porous fill having interconnected interstitial voids for the flow of fluid therethrough,
a seal member closing said opening in said shell cavity,
fluid inlet and outlet openings in said seal member for the circulation of a heat exchange fluid through said cavity to control the temperature of said shell outer surface,
heat sink elements embedded in said shell adjacent to said shell outer surface and extending into said cavity for transferring heat from said shell.
2. Molding apparatus as set forth in claim 1 in which said porous fill includes,
substantially spherical cellular ceramic nodules with a coating of a resinous bonding material,
said cellular ceramic nodules bonded as a rigid mass and providing structural support for said shell and interstitial voids for the flow of fluid therethrough.
3. Molding apparatus as set forth in claim 2 in which said porous fill includes,
a rigid mass of cellular ceramic nodules bonded to each other by a resinous bonding material, said nodules having a diameter of about one-sixth of an inch and said porous mass comprising about 50 percent by weight cellular ceramic nodules and about 50 percent by weight resinous bonding material, said porous mass having about 30 percent by volume interconnected interstitial voids.
4. Molding apparatus as set forth in claim 1 in which said heat sink elements include,
a wire mesh portion embedded in said shell,
a tubular member secured to said wire mesh and extending rearwardly therefrom into said cavity.
5. In a molding apparatus comprising,
a shell having an outer surface with a preselected configuration and a cavity with an opening therein, said shell including at least one layer of a thermosetting resinous compound,
a porous fill positioned in said cavity, said porous fill including substantially spherical cellular ceramic nodules with a coating of resinous bonding material,
said cellular ceramic nodules bonded as a rigid mass and providing structural support for said shell and interstitial voids for the flow of fluid therethrough,
heat sink elements embedded in said shell adjacent said shell outer surface and extending into said porous fill in said cavity for transferring heat from said shell,
a seal member closing said opening in said shell cavity, and
fluid inlet and outlet openings in said seal member for the circulation of heat exchange fluid through said cavity to control the temperature of said shell outer surface.
6. Molding apparatus as set forth in claim 1 in which said shell includes,
a first coating forming the outer surface of said shell, said first coating having a thickness of about 1 millimeter,
a second coating positioned on said first coating and having a thickness of about 2 millimeters,
a structural layer of a thermosetting resinous compound positioned on said second coating and having a thickness of about 3 millimeters.
7. Molding apparatus as set forth in claim 6 which includes,
heat sink elements embedded in said second coating adjacent to said first coating and extending through said structural layer into said cavity for transferring heat from said shell.
8. Molding apparatus as set forth in claim 1 which includes,
a plurality of conduits within said cavity having end portions extending through said shell and other end portions connected to a common conduit.

* * * * *